(12) United States Patent
Tseng

(10) Patent No.: US 8,138,618 B2
(45) Date of Patent: Mar. 20, 2012

(54) OSCILLATING POWER GENERATOR WITH A RATCHET MECHANISM

(75) Inventor: Tien-Chung Tseng, Taipei Hsien (TW)

(73) Assignee: Winstron Corporation, Xizhi Dist., New Taipei (TW)

( * ) Notice: Subject to any disclaimer, the term of this patent is extended or adjusted under 35 U.S.C. 154(b) by 395 days.

(21) Appl. No.: 12/403,338

(22) Filed: Mar. 12, 2009

(65) Prior Publication Data

US 2010/0011890 A1    Jan. 21, 2010

(30) Foreign Application Priority Data

Jul. 17, 2008 (TW) .............................. 97212760 U

(51) Int. Cl.
*F16H 27/02* (2006.01)
*F03G 3/06* (2006.01)
*F02B 63/04* (2006.01)
*H02K 7/06* (2006.01)

(52) U.S. Cl. ............. 290/1 C; 74/143; 290/1 R; 310/37; 322/3

(58) Field of Classification Search .................. 290/1 C, 290/1 R; 74/141.5, 142, 143; 322/3; 310/37
See application file for complete search history.

(56) References Cited

U.S. PATENT DOCUMENTS

| 4,228,360 A * | 10/1980 | Navarro ........................ 290/43 |
| 2007/0090703 A1* | 4/2007 | Yeh ............................... 310/83 |
| 2010/0148517 A1* | 6/2010 | Duclos .......................... 290/1 C |

FOREIGN PATENT DOCUMENTS

JP          2004-52747       *    2/2004

* cited by examiner

*Primary Examiner* — Burton Mullins
(74) *Attorney, Agent, or Firm* — Winston Hsu; Scott Margo

(57) ABSTRACT

An oscillating power generator includes a base, an energy transforming device, and an oscillating transmission device. The energy transforming device is disposed on the base for generating electric energy. The oscillating transmission device is disposed on the base for driving a driven gear shaft of the energy transforming device. The oscillating transmission device includes an oscillating part, a first ratchet transmission mechanism, and a transmission mechanism. The oscillating part is disposed outside the base in an oscillating manner. The first ratchet transmission mechanism is engaged with the driven gear shaft. The transmission mechanism is connected to the oscillating part and the first ratchet transmission mechanism for driving the first ratchet transmission mechanism when the oscillating part is oscillating, so as to drive the driven gear shaft of the energy transforming device to rotate.

20 Claims, 5 Drawing Sheets

OSCILLATING POWER GENERATOR WITH A RATCHET MECHANISM

BACKGROUND OF THE INVENTION

1. Field of the Invention

The present invention relates to a power generator, and more specifically, to an oscillating power generator with a ratchet mechanism.

2. Description of the Prior Art

With improvement of battery technology, a rechargeable battery has become an indispensable part in electronic products. A main energy charging method involves utilizing a charging device electrically connected to a power supply to recharge a battery installed in an electronic product. Due to increasing awareness of environmental protection issues, many charging devices for recharging electronic products with clean energy are manufactured accordingly, such as a solar charger, a hand-powered device, and so forth.

The said solar charger involves utilizing a solar panel to absorb solar energy so as to transform the solar energy into electric energy. The said hand-powered device involves utilizing a motor that may transform mechanical energy into electric energy, meaning that a user may rotate a drive shaft of the motor to make electromagnetic induction occur in the motor to generate electric energy. However, applications of the said charging devices are limited. For a solar charger, environmental factors may influence the charging efficiency of the solar charger greatly. For example, if the solar charger lies in an environment of sufficient sunlight, the solar charger may provide sufficient electric energy to electronic products. On the contrary, if the solar charger lies in a dark environment, the solar charger may even not provide any electric energy to electronic products so as to make the solar charger inconvenient in use. Furthermore, for a hand-powered device, a user needs to provide mechanical energy so that the motor may be driven to generate electric energy, such as shaking the hand-powered device or rotating the drive shaft of the hand-powered device. Thus, it is time and energy consuming to use the hand-powered device to charge electronic products. Besides, charging efficiency of a hand-powered device is not as good as that of a solar charger.

SUMMARY OF THE INVENTION

Therefore, the present invention provides an oscillating power generator with a ratchet mechanism to solve the aforementioned problems.

The present invention provides an oscillating power generator with a ratchet mechanism comprising a base; an energy transforming device disposed on the base for generating electric energy, the energy transforming device having a driven gear shaft; and an oscillating transmission device disposed on the base for driving the driven gear shaft of the energy transforming device to make the energy transforming device generate electric energy, the oscillating transmission device comprising an oscillating part disposed outside the base in an oscillating manner; a first ratchet transmission mechanism engaged with the driven gear shaft, the first ratchet transmission mechanism comprising a first gear having a first ratchet structure; and a second gear disposed at a side of the first gear, a first ratchet driving part being formed inside the second gear for engaging with the first ratchet structure and driving the first gear to rotate in a first direction; and a transmission mechanism connected to the oscillating part and the first ratchet transmission mechanism for driving the first ratchet transmission mechanism when the oscillating part is oscillating, so as to drive the driven gear shaft of the energy transforming device to rotate.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
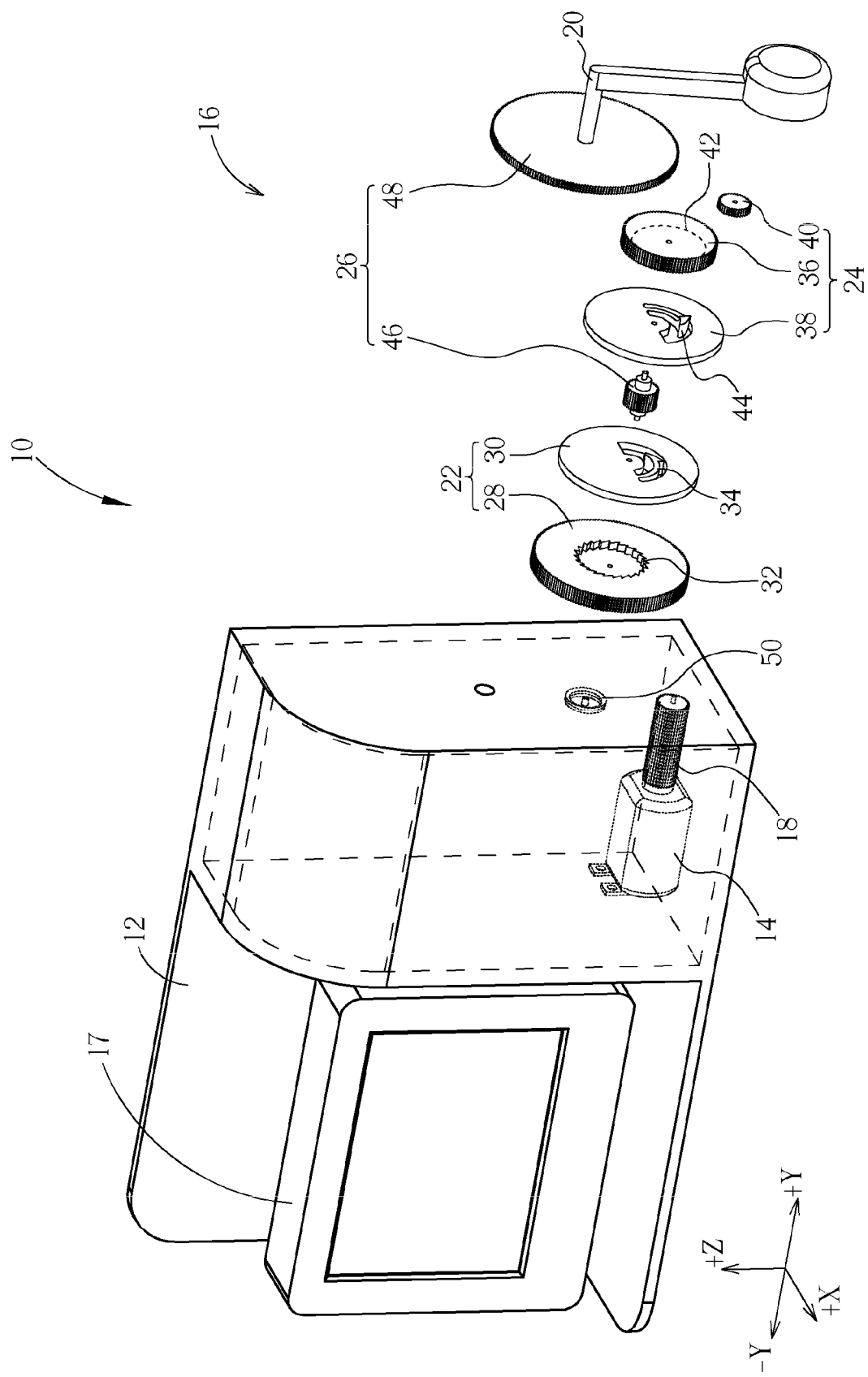
FIG. 1 is an exploded diagram of the oscillating power generator according to a preferred embodiment of the present invention.
Figure 3:
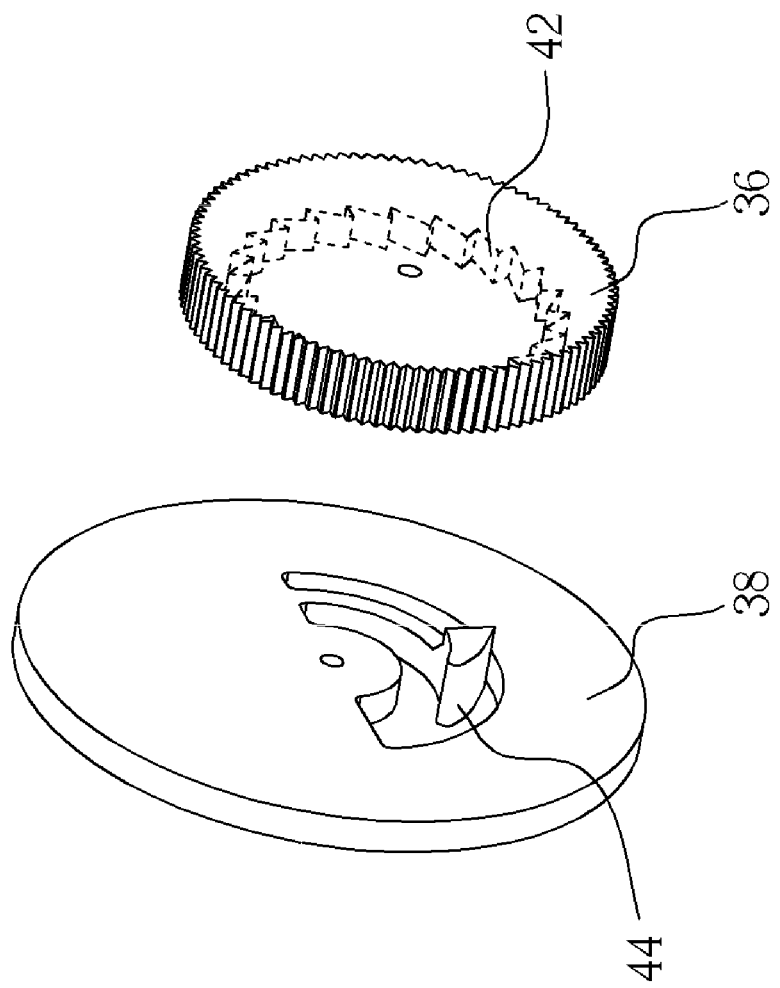
FIG. 3 is an enlarged diagram of the third gear and the fourth gear in FIG. 1.

Please refer to FIG. 1. FIG. 1 is an exploded diagram of an oscillating power generator 10 according to a preferred embodiment of the present invention. The oscillating power generator 10 comprises a base 12, an energy transforming device 14, an oscillating transmission device 16, and an electronic device 17. The energy transforming device 14 is disposed on the base 12 for generating electric energy. The energy transforming device 14 has a driven gear shaft 18. The energy transforming device 14 may be a direct current generator or an alternating current generator for transforming mechanical energy into electric energy. The oscillating transmission device 16 is disposed on the base 12. The oscillating transmission device 16 is used for driving the driven gear shaft 18 of the energy transforming device 14 to make the energy transforming device 16 generate electric energy. The oscillating transmission device 16 comprises an oscillating part 20, a first ratchet transmission mechanism 22, a second ratchet transmission mechanism 24, and a transmission mechanism 26. The oscillating part 20 is disposed outside the base 12 in an oscillating manner. The oscillating part 20 may be a pendulum or other similar part which may oscillate automatically after experiencing an external force. The first ratchet transmission mechanism 22 is connected to a side of the transmission mechanism 26. The first ratchet transmission mechanism 22 comprises a first gear 28 and a second gear 30. As shown in FIG. 1, a first ratchet structure 32 is formed inside the first gear 28, and the second gear 30 is disposed at a side of the first gear 28. A first ratchet driving part 34 is formed inside the second gear 30. The first ratchet driving part 34 is used for engaging with the first ratchet structure 32 and driving the first gear 28 to rotate around a −Y-axis in FIG. 1 (clockwise in FIG. 1). The second ratchet transmission mechanism 24 is connected to the transmission mechanism 26 and disposed at a side of the transmission mechanism 26 opposite to the first ratchet transmission mechanism 22 (as shown in FIG. 1). The second ratchet transmission mechanism 24 comprises a third gear 36, a fourth gear 38, and a fifth gear 40. As shown in FIG. 1, a second ratchet structure 42 is formed inside the third gear 36. In FIG. 1, the second ratchet structure 42 is shown by dashed lines, and the detailed structure of the second ratchet structure 42 is shown in FIG. 3. The fourth gear 38 is disposed at a side of the third gear 36. A second ratchet driving part 44 is formed inside the fourth gear 38. The second ratchet driving part 44 is used for engaging with the second ratchet structure 42 and driving the third gear 36 to rotate around a +Y-axis in FIG. 1 (counterclockwise in FIG. 1). The fifth gear 40 is engaged with the third gear 36 and the driven gear shaft 18 of the energy transformation device 14. The fifth gear 40 may be an idle gear or other similar part. The transmission mechanism 26 is used for driving the first ratchet transmission mechanism 22 and the second ratchet transmission mechanism 24 when the oscillating part 20 is oscillating, so as to drive the driven gear shaft 18 of the energy transforming device 14 to rotate. The transmission mechanism 26 comprises a driven gear 46 and a driving gear 48. The driven gear 46 is fixed to the second gear 30 and the fourth gear 38 concentrically. The driving gear 48 is connected to the oscillating part 20 and engaged with the driven gear 46. The driving gear 48 is used for driving the driven gear 46 to rotate when the oscillating part 20 is oscillating. The electronic device 17 is disposed in the base 12 and electrically connected to the energy transforming device 14. The electronic device 17 is used for receiving the electric energy generated by the energy transforming device 14. The electronic device 17 may be a common rechargeable device, such as a mobile phone, a rechargeable battery, a GPS (Global Positioning System) device, and so forth.

Furthermore, as shown in FIG. 1, the oscillating power generator 10 may further comprise an elastic part 50. The elastic part 50 is disposed between the first ratchet transmission mechanism 22 and the base 12. In an embodiment of the present invention, the elastic part 50 may be a spring or other part capable of providing elastic force. The elastic part 50 is used for providing elastic force to the first ratchet transmission mechanism 22 so as to make the first ratchet transmission mechanism 22 abut against the transmission mechanism 26. Disposal of the elastic part 50 may be not limited to the said location. If the oscillating power generator 10 needs to utilize elastic force to make the second ratchet transmission mechanism 24 abut against the transmission mechanism 26, the elastic part 50 may also be disposed between the second ratchet transmission mechanism 24 and the base 12 instead. In other words, disposal of the elastic part 50 may depend on practical design needs.

Figure 2:
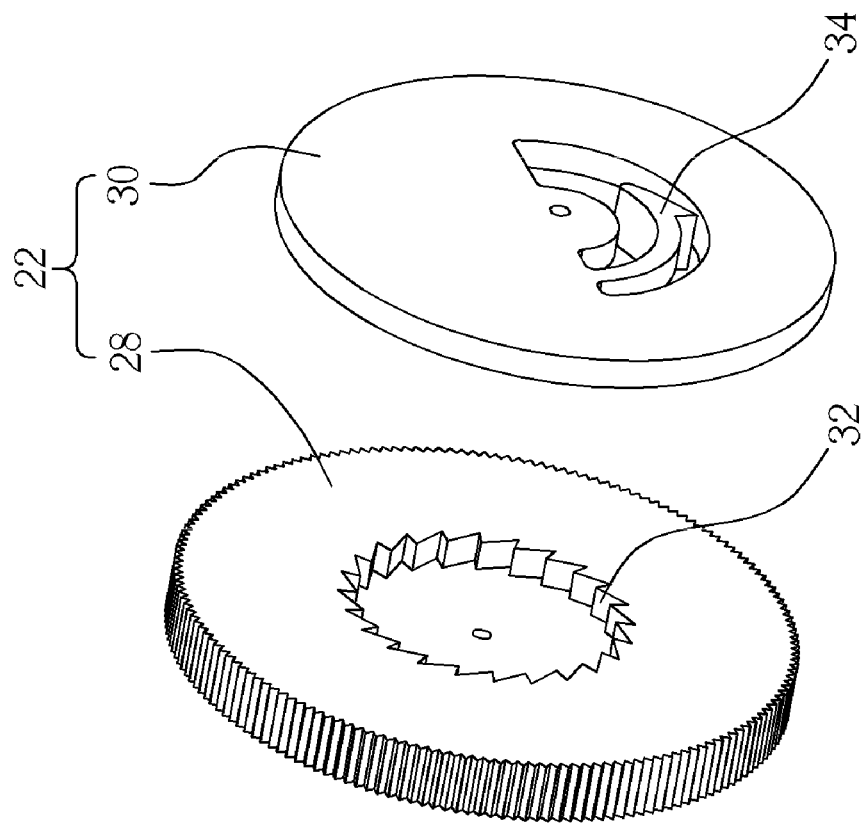
FIG. 2 is an enlarged diagram of the first ratchet transmission mechanism in FIG. 1.

First, more detailed description for the first ratchet transmission mechanism 22 and the second ratchet transmission mechanism 24 is provided as follows. Please refer to FIG. 2 and FIG. 3. FIG. 2 is an enlarged diagram of the first ratchet transmission mechanism 22 in FIG. 1. FIG. 3 is an enlarged diagram of the third gear 36 and the fourth gear 38 in FIG. 1. As shown in FIG. 2 and FIG. 3, the tooth arrangement of the first ratchet structure 32 in the first gear 28 is opposite to the tooth arrangement of the second ratchet structure 42 in the third gear 36. Similarly, disposal of the first ratchet driving part 34 in the second gear 30 is also opposite to disposal of the second ratchet driving part 44 in the fourth gear 38. Thus, the first ratchet driving part 34 and the second ratchet driving part 44 may be engaged with the first ratchet structure 32 in the first gear 28 and the second ratchet structure 42 in the third gear 36 respectively.

Figure 4:
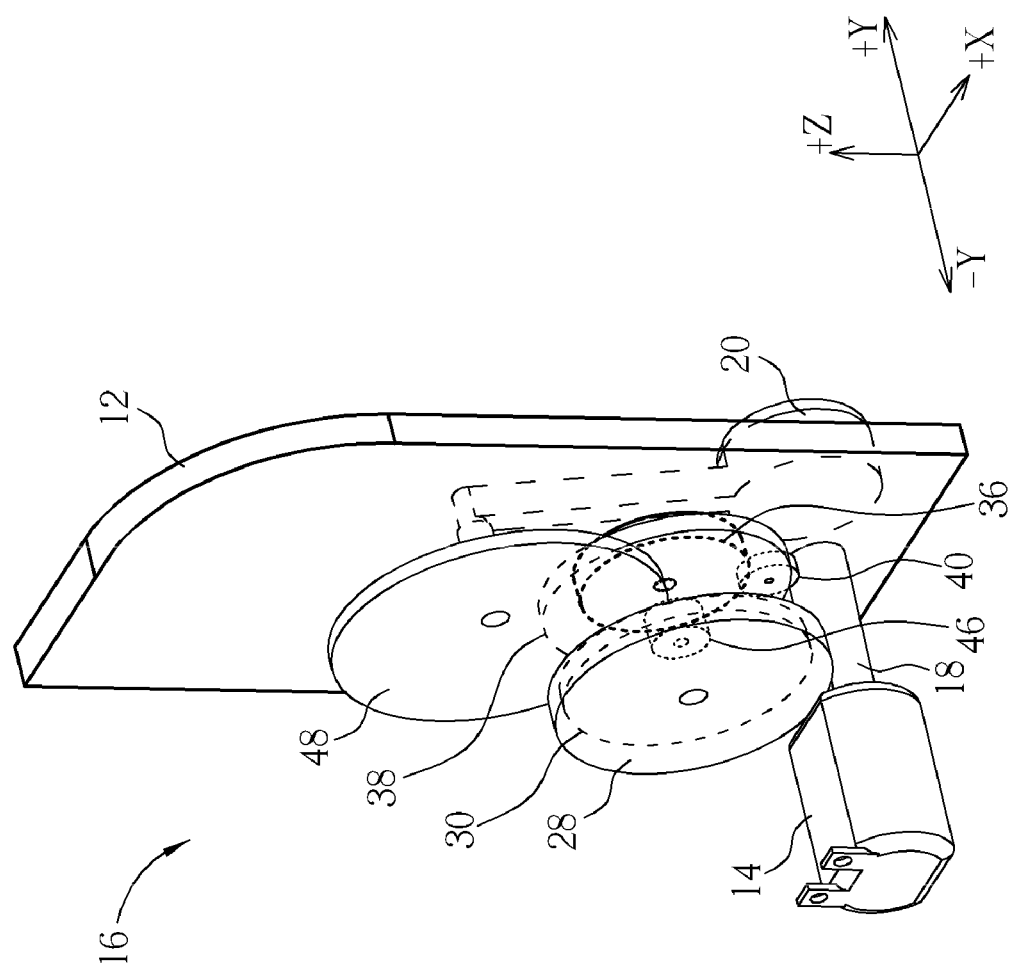
FIG. 4 is an assembly diagram of the oscillating transmission device in FIG. 1.

Next, more detailed description for the oscillating power generator 10 is provided as follows. Please refer to FIG. 2, FIG. 3, and FIG. 4 at the same time. FIG. 4 is an assembly diagram of the oscillating transmission device 16 in FIG. 1. When the oscillating part 20 oscillates around the +Y-axis in FIG. 4 (clockwise in FIG. 4), the oscillating part 20 may drive the driving gear 48 to rotate around the +Y-axis at the same time, so that the driven gear 46 engaged with the driving gear 48 is driven to rotate around the −Y-axis (counterclockwise in FIG. 4). Next, since the second gear 30 and the fourth gear 38 are fixed to the driven gear 46 concentrically, the second gear 30 and the fourth gear 38 may rotate around the −Y-axis with rotation of the driven gear 46. At this time, when the second gear 30 rotates around the −Y-axis, as shown in FIG. 2, the first ratchet driving part 34 may abut against one ratchet of the first ratchet structure 32 to drive the first gear 28 to rotate around the −Y-axis (clockwise in FIG. 2). On the contrary, since the engaging direction of the second ratchet driving part 44 and the second ratchet structure 42 of the third gear 36 is opposite to the engaging direction of the first ratchet driving part 34 and the first ratchet structure 32, as shown in FIG. 3, the second ratchet driving part 44 may slide among ratchets of the second ratchet structure 42 clockwise instead of abutting against one of the ratchets. Thus, the second ratchet driving part 44 is incapable of driving the second ratchet structure 42 to rotate, thereby keeping the third gear 36 still. In other words, the third gear 36 may not rotate around the −Y-axis with rotation of the fourth gear 38. When the second gear 30 drives the first gear 28 to rotate around the −Y-axis via the engagement of the first ratchet driving part 34 and the first ratchet structure 32, the first gear 28 may drive the driven gear shaft 18 around the +Y-axis (clockwise in FIG. 4) at the same time since the first gear 28 is engaged with the driven gear shaft 18 of the energy transforming device 14. In such a manner, as shown in FIG. 4, when the oscillating part 20 oscillates around the +Y-axis clockwise, the driven gear shaft 18 of the energy transforming device 14 may be rotated around the +Y-axis clockwise via the transmission between the said gears inside the oscillating transmission device 16 and the said ratchet structures. As a result, when the driven gear shaft 18 is rotated clockwise around the +Y-axis, the energy transforming device 14 may provide electric energy generated by electromagnetic induction to the electronic device 17 electrically connected to the energy transforming device 14, so as to start the charging process for the electronic device 17.

Similarly, when the oscillating part 20 oscillates to the highest point around the +Y-axis in FIG. 4 and then starts to oscillate back, meaning that the oscillating part 20 starts to oscillate around the −Y-axis (counterclockwise in FIG. 4), the oscillating part 20 may drive the driving gear 48 to rotate around the −Y-axis at the same time, so that the driven gear 46 engaged with the driving gear 48 is driven to rotate around the +Y-axis (clockwise in FIG. 4). Next, since the second gear 30 and the fourth gear 38 are fixed to the driven gear 46 concentrically, the second gear 30 and the fourth gear 38 may rotate around the +Y-axis with rotation of the driven gear 46. At this time, when the fourth gear 38 rotates around the +Y-axis, as shown in FIG. 3, the second ratchet driving part 44 may abut against one ratchet of the second ratchet structure 42 to drive the third gear 36 to rotate around the +Y-axis (counterclockwise in FIG. 3). On the contrary, since the engaging direction of the first ratchet driving part 34 and the first ratchet structure 32 of the first gear 28 is opposite to the engaging direction of the second ratchet driving part 44 of the second gear 30 and the second ratchet structure 42 of the third gear 36, as shown in FIG. 2, the first ratchet driving part 34 may slide counterclockwise among ratchets of the first ratchet structure 32 instead of abutting against one of the ratchets. Thus, the first ratchet driving part 34 is incapable of driving the first ratchet structure 32 to rotate, thereby keeping the first gear 28 still. In other words, the first gear 28 may not rotate around the +Y-axis with rotation of the second gear 30. After the fourth gear 38 drives the third gear 36 to rotate around the +Y-axis via the engagement of the second ratchet driving part 44 and the second ratchet structure 42, as shown in FIG. 4, the fifth gear 40 may drive the driven gear shaft 18 of the energy transforming device 14 around the +Y-axis (clockwise in FIG. 4) with rotation of the third gear 36 at the same time since the fifth gear 40 is engaged with the third gear 36 and the driven gear shaft 18. In such a manner, as shown in FIG. 4, when the oscillating part 20 oscillates counterclockwise around the −Y-axis, the driven gear shaft 18 of the energy transforming device 14 may be rotated around the +Y-axis clockwise via the transmission between the said gears inside the oscillating transmission device 16 and the said ratchet structures. As a result, when the driven gear shaft 18 rotates clockwise around the +Y-axis, the energy transforming device 14 may provide electric energy generated by electromagnetic induction to the electronic device 17, so as to start the charging process for the electronic device 17.

In summary, no matter whether the oscillating part 20 oscillates around the +Y-axis or the −Y-axis, the oscillating power generator 10 may drive the driven gear shaft 18 of the energy transforming device 14 to rotate around the +Y-axis via disposal of the said gears inside the oscillating transformation device 16 and the said ratchet structures. In other words, the oscillating power generator 10 may drive the driven gear shaft 18 to rotate in the same direction continuously when the oscillating part 20 is oscillating back and forth, so as to drive the energy transforming device 14 to provide electric energy to the electronic device 17 continuously. It should be mentioned that the disposal of the transmission mechanisms inside the oscillating transmission device 16 is not limited to the disposal mentioned in the said embodiment. That is to say, the first ratchet transmission mechanism 22 and the second ratchet transmission mechanism 24 may be disposed in the oscillating transmission device 16 alternatively. For example, if there is only the first ratchet transmission mechanism 22 disposed in the oscillating transmission device 16, as mentioned above, the first ratchet structure 32 of the first gear 28 may be driven to rotate around the −Y-axis by the first ratchet driving part 34 of the second gear 30 only when the oscillating part 20 oscillates around the +Y-axis, so as to drive the driven gear shaft of the energy transforming device 14 to rotate around the +Y-axis. Thus, compared with the continuous rotation of the driven gear shaft 18 on condition that both the first ratchet transmission mechanism 22 and the second ratchet transmission mechanism 24 are disposed in the oscillating transmission device 16, the oscillating power generator 10 may drive the driven gear shaft 18 to rotate intermittently when the oscillating part 20 oscillates back and forth.

Figure 5:
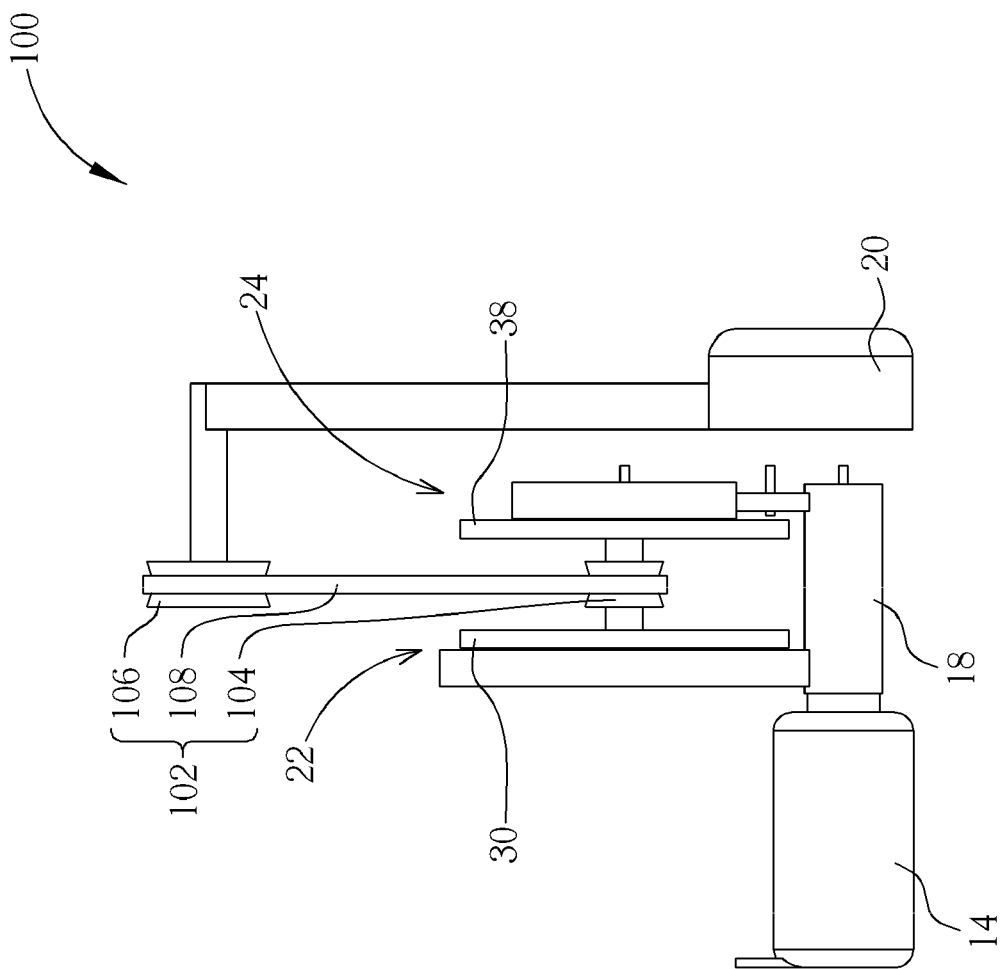
FIG. 5 is a front view of the oscillating transmission device according to another embodiment of the present invention.

Furthermore, the structural design of the transmission mechanism 26 is not limited to the said design, meaning that the structural design of the transmission mechanism 26 may also be changed to other common transformation designs. Please refer to FIG. 5. FIG. 5 is a front view of an oscillating transmission device 100 according to another embodiment of the present invention. Components mentioned in the two embodiments represent components with similar functions or similar positions. The difference between the oscillating transmission device 100 and the oscillating transmission device 16 is a structural design of the transmission mechanism. As shown in FIG. 5, the oscillating transmission device 100 comprises the oscillating part 20, the first ratchet transmission mechanism 22, the second ratchet transmission mechanism 24, and a transmission mechanism 102. The transmission mechanism 102 comprises a driven pulley 104, a driving pulley 106, and a belt 108. The driven pulley 104 is fixed to the second gear 30 and the fourth gear 38. The driving pulley 106 is connected to the oscillating part 20, and the belt 108 is connected to the driving pulley 106 and the driven pulley 104. The belt 108 is used for driving the driven pulley 104 to rotate when the driving pulley 106 rotates with the oscillating part 20 back and forth. In other words, the oscillating transmission device 100 may transmit the mechanical energy generated by the oscillating part 20 to the first ratchet transmission mechanism 22 and the second ratchet transmission mechanism 24 via the linkage of the driven pulley 104, the driving pulley 106, and the belt 108.

Compared with the prior art, in which a solar charger or a hand-powered device is utilized to provide clean energy to electronic devices, the oscillating power generator of the present invention drives the energy transforming device to generate electric energy for charging electronic devices via the said linkage of the inner transmission mechanisms and the outer oscillating part. Thus, a user may just push the oscillating part of the oscillating power generator to oscillate back and forth, so as to drive the oscillating power generator to provide electric energy to the electronic devices needed to be recharged. As a result, the oscillating power generator of the present invention may not only avoid the said problem that the environmental factors may influence the solar energy generating efficiency greatly, but also resolves the said time and energy consuming problem of the hand-powered device.

Those skilled in the art will readily observe that numerous modifications and alterations of the device and method may be made while retaining the teachings of the invention.

What is claimed is:

1. An oscillating power generator with a ratchet mechanism comprising:
    a base;
    an energy transforming device disposed on the base for generating electric energy, the energy transforming device having a driven gear shaft; and
    an oscillating transmission device disposed on the base for driving the driven gear shaft of the energy transforming device to make the energy transforming device generate electric energy, the oscillating transmission device comprising:
        an oscillating part disposed outside the base in an oscillating manner;
        a first ratchet transmission mechanism engaged with the driven gear shaft, the first ratchet transmission mechanism comprising:
            a first gear having a first ratchet structure; and
            a second gear disposed at a side of the first gear, a first ratchet driving part being formed inside the second gear for engaging with the first ratchet structure and driving the first gear to rotate in a first direction;
        a second ratchet transmission mechanism disposed at a side of the first ratchet transmission mechanism, the second ratchet transmission mechanism comprising:
            a third gear having a second ratchet structure;
            a fourth gear disposed at a side of the third gear, a second ratchet driving part being formed inside the fourth gear for engaging with the second ratchet structure and driving the first gear to rotate in a second direction, the second direction being opposite to the first direction; and
            a fifth gear engaged with the third gear and the driven gear shaft of the energy transforming device; and
        a transmission mechanism connected to the oscillating part, the second ratchet transmission mechanism and the first ratchet transmission mechanism for driving the first ratchet transmission mechanism and the second ratchet transmission mechanism when the oscillating part is oscillating, so as to drive the driven gear shaft of the energy transforming device to rotate.

2. The oscillating power generator of claim 1 further comprising:
an electronic device disposed in the base and electrically connected to the energy transforming device for receiving the electric energy generated by the energy transforming device.

3. The oscillating power generator of claim 1, wherein the transmission mechanism comprises:
a driven gear fixed to the second gear and the fourth gear; and
a driving gear connected to the oscillating part and engaged with the driven gear for driving the driven gear to rotate when the oscillating part is oscillating.

4. The oscillating power generator of claim 1, wherein the transmission mechanism comprises:
a driven pulley fixed to the second gear and the fourth gear;
a driving pulley connected to the oscillating part; and
a belt connected to the driving pulley and the driven pulley for driving the driven pulley to rotate when the oscillating part is oscillating.

5. The oscillating power generator of claim 1, wherein the first ratchet transmission mechanism further comprises:
a third gear engaged with the first gear and the driven gear shaft of the energy transforming device.

6. The oscillating power generator of claim 5, wherein the transmission mechanism comprises:
a driven gear fixed to the second gear; and
a driving gear connected to the oscillating part and engaged with the driven gear for driving the driven gear to rotate when the oscillating part is oscillating.

7. The oscillating power generator of claim 5, wherein the transmission mechanism comprises:
a driven pulley fixed to the second gear;
a driving pulley connected to the oscillating part; and
a belt connected to the driving pulley and the driven pulley for driving the driven pulley to rotate when the oscillating part is oscillating.

8. The oscillating power generator of claim 1 further comprising an elastic part disposed between the first ratchet transmission mechanism and the base for providing an elastic force to the first ratchet transmission mechanism so as to make the first ratchet transmission mechanism abut against the transmission mechanism.

9. The oscillating power generator of claim 1, wherein the oscillating part is a pendulum.

10. The oscillating power generator of claim 1, wherein the energy transformation device is a direct current generator.

11. The oscillating power generator of claim 1, wherein the energy transformation device is an alternating current generator.

12. An oscillating power generator with a ratchet mechanism comprising:
a base;
an energy transforming device disposed on the base for generating electric energy, the energy transforming device having a driven gear shaft; and
an oscillating transmission device disposed on the base for driving the driven gear shaft of the energy transforming device to make the energy transforming device generate electric energy, the oscillating transmission device comprising:
an oscillating part disposed outside the base in an oscillating manner;
a first ratchet transmission mechanism engaged with the driven gear shaft, the first ratchet transmission mechanism comprising:
a first gear having a first ratchet structure; and
a second gear disposed at a side of the first gear, a first ratchet driving part being formed inside the second gear for engaging with the first ratchet structure and driving the first gear to rotate in a first direction; and
a transmission mechanism connected to the oscillating part and the first ratchet transmission mechanism, the transmission mechanism comprising:
a driven gear fixed to the second gear; and
a driving gear connected to the oscillating part and engaged with the driven gear for driving the driven gear to rotate when the oscillating part is oscillating, so as to drive the driven gear shaft of the energy transforming device to rotate.

13. The oscillating power generator of claim 12 further comprising:
an electronic device disposed in the base and electrically connected to the energy transforming device for receiving the electric energy generated by the energy transforming device.

14. The oscillating power generator of claim 12, wherein the first ratchet transmission mechanism further comprises:
a third gear engaged with the first gear and the driven gear shaft of the energy transforming device.

15. The oscillating power generator of claim 12 further comprising an elastic part disposed between the first ratchet transmission mechanism and the base for providing an elastic force to the first ratchet transmission mechanism so as to make the first ratchet transmission mechanism abut against the transmission mechanism.

16. The oscillating power generator of claim 12, wherein the oscillating part is a pendulum.

17. An oscillating power generator with a ratchet mechanism comprising:
a base;
an energy transforming device disposed on the base for generating electric energy, the energy transforming device having a driven gear shaft; and
an oscillating transmission device disposed on the base for driving the driven gear shaft of the energy transforming device to make the energy transforming device generate electric energy, the oscillating transmission device comprising:
an oscillating part disposed outside the base in an oscillating manner;
a first ratchet transmission mechanism engaged with the driven gear shaft, the first ratchet transmission mechanism comprising:
a first gear having a first ratchet structure; and
a second gear disposed at a side of the first gear, a first ratchet driving part being formed inside the second gear for engaging with the first ratchet structure and driving the first gear to rotate in a first direction; and
a transmission mechanism connected to the oscillating part and the first ratchet transmission mechanism, the transmission mechanism comprising:
a driven pulley fixed to the second gear;
a driving pulley connected to the oscillating part; and
a belt connected to the driving pulley and the driven pulley for driving the driven pulley to rotate when the oscillating part is oscillating, so as to drive the driven gear shaft of the energy transforming device to rotate.

18. The oscillating power generator of claim 17 further comprising:

an electronic device disposed in the base and electrically connected to the energy transforming device for receiving the electric energy generated by the energy transforming device.

19. The oscillating power generator of claim 17, wherein the first ratchet transmission mechanism further comprises:
a third gear engaged with the first gear and the driven gear shaft of the energy transforming device.

20. The oscillating power generator of claim 17 further comprising an elastic part disposed between the first ratchet transmission mechanism and the base for providing an elastic force to the first ratchet transmission mechanism so as to make the first ratchet transmission mechanism abut against the transmission mechanism.

* * * * *

UNITED STATES PATENT AND TRADEMARK OFFICE
CERTIFICATE OF CORRECTION

PATENT NO. : 8,138,618 B2  Page 1 of 1
APPLICATION NO. : 12/403338
DATED : March 20, 2012
INVENTOR(S) : Tien-Chung Tseng It is certified that error appears in the above-identified patent and that said Letters Patent is hereby corrected as shown below:

On the title page, item (73), correct the name of the assignee from "Winstron Corporation" to --Wistron Corporation--.

Signed and Sealed this
Twenty-ninth Day of May, 2012

David J. Kappos
*Director of the United States Patent and Trademark Office*